May 13, 1952 A. P. McKAY 2,596,579
TRACTOR BORNE DISK HARROW
Filed April 24, 1946 2 SHEETS—SHEET 1
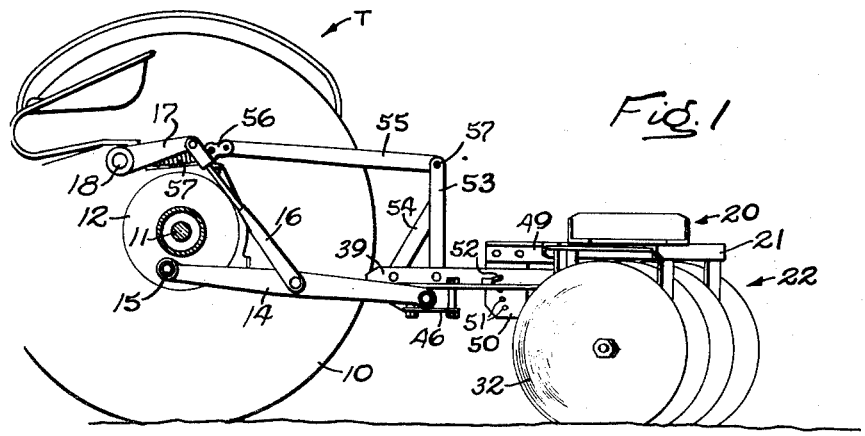
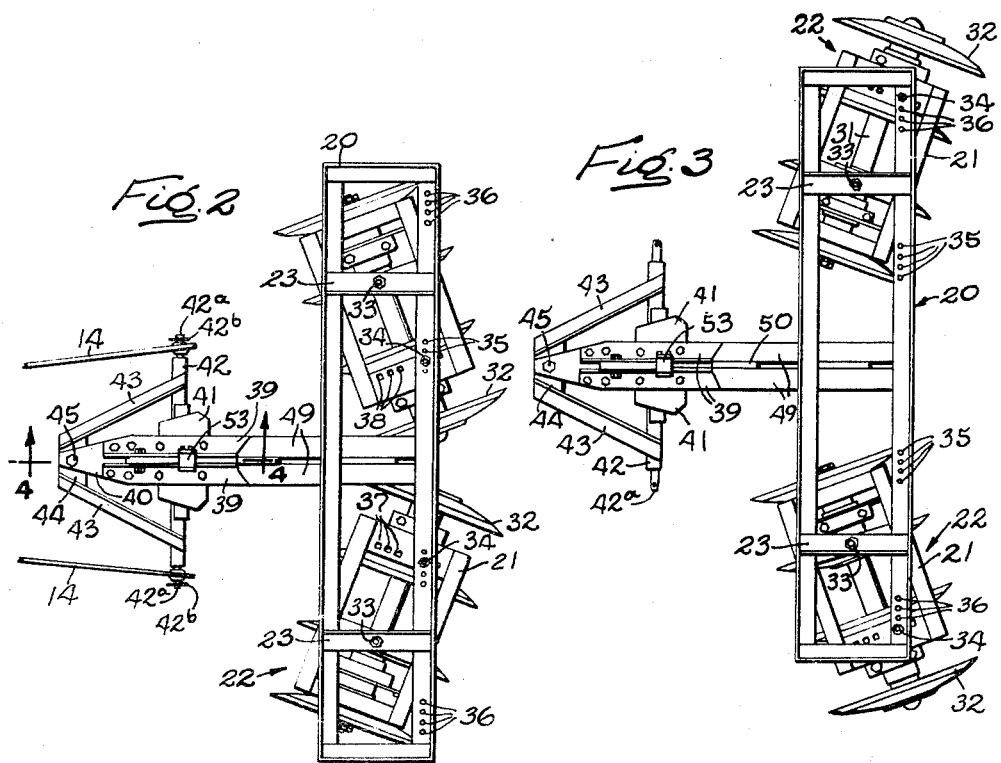
INVENTOR
Augusta P. McKay
By Carlson, Pitzner, Hubbard & Wolfe
ATTORNEYS

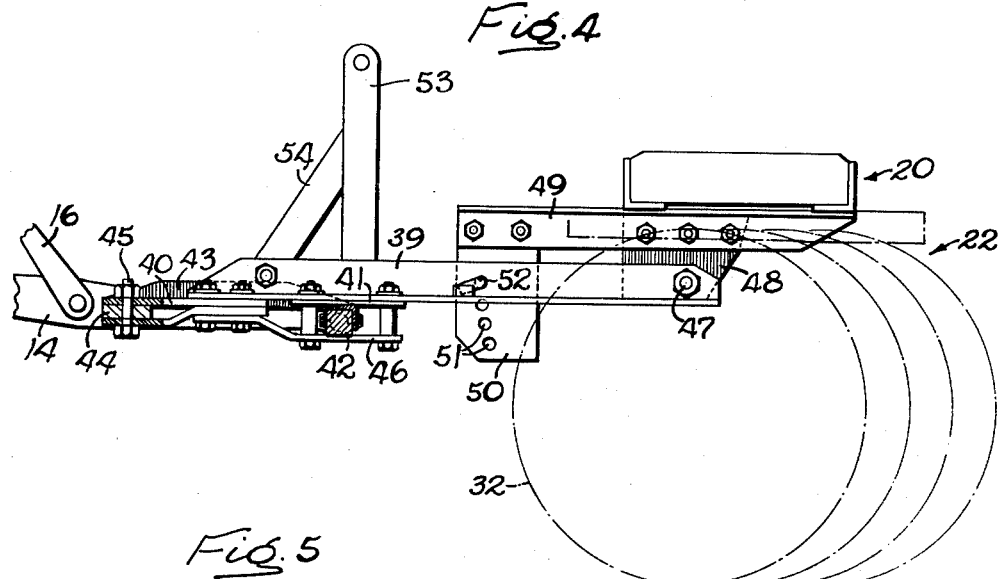
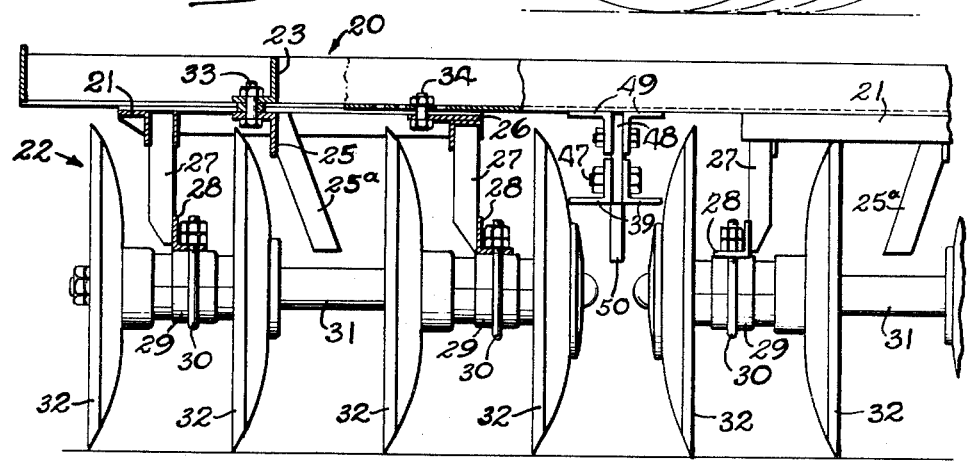
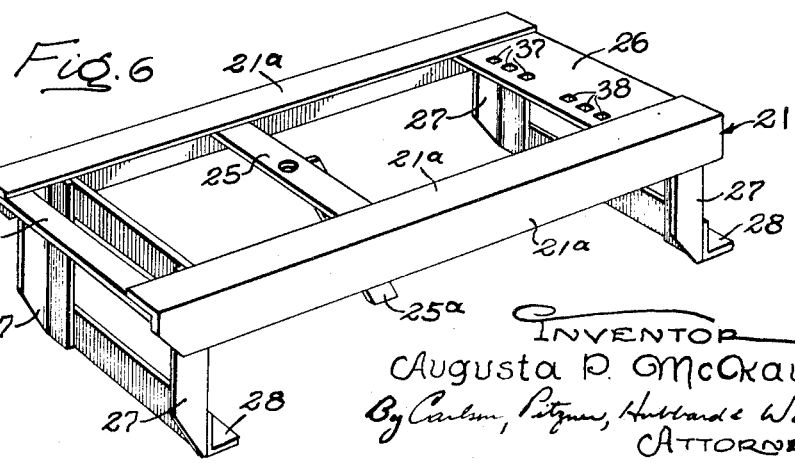

Patented May 13, 1952

2,596,579

UNITED STATES PATENT OFFICE 2,596,579

TRACTOR BORNE DISK HARROW

Augusta P. McKay, Cedartown, Ga., assignor to Rome Plow Company, Cedartown, Ga., a corporation of Georgia Application April 24, 1946, Serial No. 664,510

7 Claims. (Cl. 55—81)

The present invention is particularly applicable to reversible disc harrows although in some of its broader aspects it is applicable to still other types of implements for tractors.

One object of the present invention is to provide an implement adapted to be raised and lowered by a power lift device on a tractor from which it is trailed and which embodies a novel and simplified arrangement for permitting lateral tilt of the implement to accommodate changes in ground contour, all without interfering with the raising and lowering connection.

Another object is to provide a reversible disc harrow embodying a novel and easily manipulated arrangement for connecting the gangs to the main frame so as to accommodate reversal, or angular adjustment of the gangs, or both. In particular, the arrangement is such that when the harrow main frame is elevated by a power lift device on the tractor, the gangs can be swung or pivoted, while remaining suspended beneath the main frame, to reverse or otherwise alter their positions.

Still another object is to provide a disc harrow adapted in a novel and simplified manner for effecting adjustment for alternative ridging and ditching operation.

The invention also resides in various structural improvements and novel combinations of elements by means of which a rugged and efficient implement is made possible at low cost.

Further objects and advantages of the invention will become apparent as the following description proceeds, taken in connection with the accompanying drawings, in which:

Figure 1 is a side elevation of a reversible disc harrow embodying the present invention and shown as trailed from a tractor, only the rear end portion of which appears and with the near rear wheel removed to expose the hitch mechanism, Fig. 2 is a plan view of the harrow shown in Fig. 1 and of the associated hitch elements.

Fig. 3 is a view similar to Fig. 2 but showing the harrow gangs reversed so that the discs cut in rather than out as in Fig. 2.

Fig. 4 is an enlarged end elevation of the harrow main frame and associated draft beam, with the forward portion of the latter shown in section substantially along the line 4—4 in Fig. 2, and the discs indicated simply in broken lines.

Fig. 5 is a fragmentary rear elevation of the harrow with a portion of a main frame and one of the underlying gang frames broken away.

Fig. 6 is a detailed perspective view, on a somewhat enlarged scale, of one of the two double gang frames.

Although a particular embodiment of the invention has been shown and described in some detail, there is no intention to limit the invention to such particular embodiment, but on the other hand, the intention is to cover all modifications and alternative constructions falling within the spirit and scope of the invention as expressed in the appended claims.

Referring more particularly to the drawings, the invention has been exemplified as embodied in a reversible disc harrow designed for application to a tractor such for example as that indicated at T in Fig. 1. Although only a part of the rear end portion of the tractor appears, it will be readily identified by those skilled in the art as being the familiar Ford lightweight agricultural tractor equipped with the hydraulically operated hitch mechanism of the Ferguson System. Accordingly, simply a brief identification of the few elements which appear and which are directly associated with the harrow will suffice.

The tractor T is equipped with a pair of rear traction wheels, one of which is indicated at 10 in Fig. 1, carried by a rear axle 11 and at the center portion of which is a differential housing 12. A pair of laterally spaced draft links 14 (see also Fig. 2) are universally pivoted at 15 on opposite sides of the differential housing 12, beneath and slightly forward of the rear axle 11. These links 14 trail rearwardly for attachment of an implement or the like. Drop links 16 support the draft links 14 from a pair of crank arms 17 rigid with a rock shaft 18. The latter shaft is rocked by a hydraulic ram (not shown) to oscillate the arms 17 and thus swing the draft links 14 vertically. For detail of the hydraulic unit and associated draft linkage reference may be made to Henry George Ferguson Patent No. 2,118,180, issued May 24, 1938.

As to the harrow itself, it comprises a main frame, designated generally as 20 (Fig. 2), and to the underside of which are suitably fixed the frames 21 of a pair of disc gangs designated generally as 22. By turning the individual gangs end-for-end, their discs may be faced either outward or inward, as shown respectively in Figs. 2 and 3. Moreover, the angles of the individual gangs with reference to the main frame may be selectively adjusted, all as hereinafter detailed.

The main frame 20 is shown as being of rectangular flat shape, elongated transversely of the path of travel for the implement. In the present instance it is fashioned from suitable lengths of angle iron welded together to form a rigid structure. Extending between the front and rear members of the main frame 20, at laterally spaced points, are two angle iron supporting bars 23. These bars provide center supports for the right and lefthand disc gangs and are slidable longitudinally of the main frame for adjusting the positions of the disc gangs on the main frame. The vertical webs of the angle irons making up the main frame are desirably somewhat longer than the horizontal webs (see Fig. 4) so as to stiffen the frame against bowing.

The two disc gangs 22 are duplicates; so a description of one will suffice for both. The top frame 21 of each such gang is generally rectangular in form (see Fig. 6) being fashioned from a pair of angle irons 21ᵃ joined by transverse bars 24, 25 and 26 suitably welded thereto. Depending from opposite ends of the frame 21 are pairs of legs 27 joined by angle irons 28 and to which are clamped bearings 29 by U-bolts 30 (see Fig. 5). These bearings journal a shaft 31 on which are fixed discs 32. A scraper 25ᵃ (Fig. 5) depends from the center bar 25 in position to prevent dirt from building up in the space between the center pair of discs.

The flat upper faces of the gang frames 21 are clamped in direct face-to-face contact with the flat under side of the main frame 20 to hold the gangs in position. This general style of construction minimizes the over-all height of the implement, thus doing away with the tendency to topple over which is normally incident to a high superstructure. Moreover, the connections are of a simple character, making it easy to reverse or adjust the gang positions when the main frame is elevated by the hydraulic mechanism on the tractor as is hereinafter described in somewhat more detail.

In the arrangement here shown for connecting the gangs 22 to the main frame 20, bolts 33 (Figs. 2 and 5) are passed through registering holes in the supporting bars 23 of the main frame and underlying gang frame bars 25. The tightened bolts clamp the ends of the bars 23 to the main frame in any selected position of longitudinal adjustment whereby the desired spacing of the inner ends of the two gangs may be obtained. A second point of attachment is afforded by bolts 34 passed through the proper one of two series of holes 35 and 36 in the rear rail of the main frame 20 and a corresponding one of two series of holes 37 and 38 in the gang frame bar 26. The proper holes are, of course, determined by the longitudinal position of the gang with respect to the main frame. The holes 37 and 38 determine the angle of the gangs with reference to the line of travel of the implement. Thus when the gangs are located with the discs facing outward as in Fig. 2, the bolts 34 are passed through registering ones of the holes 35 and 37 on one side and holes 35 and 38 on the other side, whereas when the discs are faced inward as in Fig. 3, the gangs are in effect turned end-for-end and the bolts 34 register with the proper holes 36. In either case, the pair of bolts 33 and 34 for each gang clamp it tightly against the underside of the main frame and a sufficient number of holes is available to afford a fairly wide range of angular adjustment of the gangs with the discs faced either inward or outward. Desirably the holes 37 and 38 are of square shape so that by using carriage bolts for the bolt 34, the usual square shanks on the latter will engage the square holes and prevent turning of the bolts when the nut is being threaded on or off.

The ease of handling the gangs 22 in reversing them is an important aspect of the connecting arrangement just described. With the main frame elevated by the hydraulic unit on the tractor, the gangs 22 are suspended beneath it, free of the ground. While so suspended, the bolts 34 are removed, but the bolts 33 are merely loosened slightly. Then the gangs can be swung or pivoted about the bolts 33 to turn them end-for-end and the bolts 34 inserted for the new position. Similarly, in adjusting the angular position of a gang, the bolt 34 is removed and shifted while the gang remains suspended by its bolt 33. In either case, that is in either reversal or angle adjustment, the operator does not have to lift and carry the gang but has merely to swing it while suspended. Such ease of manipulation contrasts sharply with older constructions in which it was necessary to exchange the two gangs bodily in effecting reversal.

Draft is applied to the main frame 20 by way of a draft beam comprising a pair of laterally spaced angle irons 39 having their forward portions joined by a pivot plate 40 and a wear plate 41. The connection of the forward end of the draft beam to the tractor draft links 14 is substantially the same as that disclosed in my Reissue Patent No. 22,627, reissued April 3, 1945. Thus a transverse drawbar 42 is connected to the trailing ends of the draft links 14 and has projecting forwardly from it a pair of struts 43 spanned by a plate 44 which receives a king pin 45 for pivoting the forward end of the draft beam closely adjacent the rear end of the tractor. The wear plate 41 coacts with an underlying wear plate 46 (Fig. 4) to slidably engage the drawbar 42 and thus guide the draft beam 39, 39 during lateral swing of the same with reference to the drawbar.

It is particularly to be observed that the draft beam 39, 39 extends rearwardly to the main frame 20 without any diagonal bracing or other impediments to torsional twisting of the beam. The beam is designed to have sufficient torsional flexibility to permit the harrow main frame to rock laterally with reference to the tractor. In this way, the implement motion is accommodated to irregularities in ground contour. On the other hand, the connection of the implement to the tractor is sufficiently rigid (there being no hinging for vertical or lateral tilt of the implement) to permit bodily raising and lowering of the implement by the hydraulically operated draft links 14 on the tractor. Two more or less conflicting requirements are thus reconciled.

Provision is made for rockably adjusting the main frame 20 with reference to the draft beam 39, 39 in a direction fore and aft the latter. By making such adjustment, the angle of the discs 32 with reference to the ground is suitably altered to effect either ridging or ditching as may be required. For purposes of such adjustment, the trailing ends of the draft beam members 39 are pivoted by a bolt 47 (Figs. 4 and 5) to a plate 48 depending beneath the main frame 20. Such plate 48 is rigidly bolted between a pair of tongue or angle irons 49 which are in turn rigid with the frame 20 and project forwardly from it. Between the leading ends of the angle irons 49 is fixed a depending adjustment plate 50 which projects down between the draft beam members 39 and has in it a series of holes 51 to receive a removable pin 52 which also passes through registering holes in the draft beam members 39. By placing the pin 52 in an appropriate one of the series of holes 51, the angle of the harrow's main frame with reference to the draft beam can be correspondingly and readily adjusted.

With the discs 32 set to cut out as in Fig. 2, and with the pin 52 in the uppermost hole 51, the discs will work the soil level as in the ordinary discing operation. By placing the pin in one or another of the holes 51, the frame 20 will be rocked backward about its pivot bolt 47 to cause the inner ones of the discs 32 to cut deeper and the outer ones to cut shallower so that the result will form a trench. On the other hand, if the gangs are reversed as in Fig. 3, rocking the main frame 20 rearwardly will cause the center discs to cut shallower and the outer ones to cut deeper so that a ridge will be formed. The depth of the ditch or height of the ridge will be determined by the hole selected within, of course, the effective range of the implement. Where the depth or height required is beyond such range, successive passes of the implement will be made. In either case the frame can be quickly and easily fixed in its desired adjusted position by the pin 52.

To complete the connection of the implement to the tractor, an upright standard 33 (Fig. 1) with a re-enforcing strut 54 is bolted to the forward portion of the draft beam 39, 39. Pivoted to the upper end of this standard 53 is a compression or top link 55 which extends forward to the tractor, the front end of this link 55 being pivoted to the shackle 56 normally provided on the tractor as part of the Ferguson system hitch. As is customary in such Ferguson system installations, forward rocking of the shackle 56 is resisted by a compression spring 57. And as detailed in the Ferguson patent referred to above, the installation on the tractor is such that when the compression in the top link 55 reaches a predetermined amount, the resultant forward rocking of the shackle 56 causes pressure fluid to be admitted to the hydraulic ram (not shown) for raising the crank arms 17. The particular implement here disclosed is not, in its normal operation, "on the system." In other words, during the normal operation of this harrow, there is not a sufficient compression load applied to the top link 55 to cause any automatic operation of the hydraulic system. The arrangement is such, however, that the drag load on the discs 32 causes the draft beam 39, 39 to tend to nose downward, thus causing the standard 53 to tend to rock forward and put the top link 55 under compression. Consequently, should the drag load on the discs become excessive, the resultant forward thrust on the top link 55 will cause the hydraulic unit to raise the draft links 14 automatically and thereby diminish the penetration of the discs into the ground and hence the load on them. The principal purpose of the standard 53 and top link 55 is in this case, however, to retain the implement draft beam 39, 39 generally horizontal as the draft links 14 are raised and lowered under manual control of the hydraulic system so that the implement will, accordingly, be raised and lowered bodily between transport and working positions.

The operation of the disclosed apparatus will, in general, be clear from the foregoing. By way of brief recapitulation let it be assumed first of all that the operator is ready to couple the implement onto the tractor. For that purpose he has only to insert the reduced pin-shaped ends 42ᵃ of the draw bar 42 (Fig. 2) in the usual ball joints at the trailing ends of the draft links 14, insert lynch pins 42ᵇ, and connect the top link 55 to the standard 53 by inserting a pivot pin 57 (Fig. 1).

The implement is adjusted for either ridging or ditching, as may be required, by placing the gangs in the proper positions of reversal as shown in Fig. 3 or 2 and then making the adjustment for the height of the ridge or depth of the ditch by removing the pin 52 and rocking the main frame 20 about its pivot pin 47 to the required position whereupon the pin 52 is reinserted.

The gangs 22 will be positioned with their disks 32 facing either in or out depending upon the particular type or form of cultivation to be accomplished. Such an implement as that shown is used for various purposes as, for example, in seed bed preparation and cultivation of row crops or in orchard or vineyard work. It may in some instances be desirable to work the earth away from the rows during a part of the growing season and finish the cultivation by working the earth back to the rows. Accordingly, the discs are faced in or out depending upon the direction of said motion desired. In the building of terraces, rice irrigation levees and similar soil moving operations, the present implement is also eminently satisfactory.

To reverse the gangs 22 with the present implement, the operator shifts the usual hand control or quadrant lever (not shown) on the tractor to cause the hydraulic unit to raise the draft links 14, thus lifting the implement bodily from the ground. The bolts 34 are removed and the bolts 33 loosened slightly so that the gangs can be swiveled freely although still remaining suspended beneath the main frame 20 by the bolts 33. The gangs are then swung into a desired position, as, for example, from that of Fig. 2 to that of Fig. 3, and the bolts 34 inserted again in the new position. Change of angle of the gangs is equally simple.

The tractor is driven to its point of use with the harrow in its elevated or transport position. Shifting the previously mentioned hand control lever on the tractor to lowering position exhausts pressure fluid from the hydraulic unit so that the draft links 14 and attached implement are permitted to lower by gravity until the discs 32 come to rest in the ground in working position.

From the foregoing it will be perceived that a simple, rugged and easily manipulatable reversible disc harrow has been provided.

I claim as my invention:

1. In a reversible disc harrow for a tractor having a power lift device thereon, the combination of a main frame having front and rear rails spanned by laterally spaced supports extending fore and aft intermediate the ends of said rails, means for detachably connecting said frame in trailed relation to the tractor and for also operatively connecting said frame to said lift device for bodily lifting and lowering thereby, a pair of disc gangs pivoted to respective ones of said supports to swing generally horizontally therebeneath while remaining suspended therefrom when said frame is bodily elevated by the power lift device, said rear rail having two pairs of rows of holes therein arranged with the rows in each pair dispersed on opposite sides of a corresponding one of said supports, each of said gangs also having a row of holes therein arranged to register individually with individual ones of said holes in said rear rail, and fastening devices adapted to be entered in any one of the holes in said rear rail and a hole in the corresponding gang for locking such gang in a corresponding position of angular adjustment with reference to said frame.

2. In an attachment for a tractor having a power lift device thereon, the combination of a main frame having a draft beam projecting forwardly therefrom, means for trailingly connecting said beam to the tractor and power lift device for lifting and lowering of the beam by such device with the beam protruding stiffly from the rear of the tractor so as to correspondingly raise and lower said frame and while leaving said beam free to swing laterally, and said beam being free of torsional bracing throughout a substantial portion of the length thereof and torsionally flexible to an extent which permits lateral tilting of said main frame with reference to the tractor in passing over uneven ground.

3. In an attachment for a tractor having a vertically swingable draft link trailing from its rear end portion as well as a power lift device on the tractor for raising said link, the combination of a main frame having a draft beam projecting forwardly therefrom, means for attaching the forward portion of said beam bodily to said draft link for lateral swing of the beam with reference to said link while retaining said beam substantially in longitudinal alignment with said link during raising and lowering of the latter, and said beam being free of torsional bracing throughout a substantial portion of the length thereof and torsionally flexible to an extent which permits lateral tilting of said main frame with reference to the tractor in passing over uneven ground.

4. In an implement attachment for a tractor having a pair of laterally spaced draft links trailingly pivoted on its rear end portion at points located forwardly of and beneath the rear axle of the tractor and arranged to be swung vertically by a power lift device on the tractor, the combination of a main frame having a draft beam projecting forwardly therefrom, means for trailingly connecting the forward portion of said draft beam to said draft links and for retaining said draft beam substantially in alignment with said links during vertical motion of the latter, an upright standard rigid with a forward portion of said draft beam, means at the upper end of said standard for pivotally connecting the same to a compression link extending forwardly to a point on the tractor above the rear axle of the latter, and said draft beam being free of torsional bracing throughout a substantial portion of the length thereof and torsionally flexible to an extent which permits lateral tilting of said main frame with reference to the tractor in passing over uneven ground.

5. In a reversible disc harrow, the combination of a centrally arranged draft beam extending longitudinally of the path of travel, a main frame extending transversely of the path of travel and pivoted on the trailing portion of said draft beam to rock generally fore and aft thereon, a pair of disc gangs pivoted beneath said main frame at points eccentric with respect to each gang, means for releasably locking said gangs in alternative reversed positions therefor, a tongue secured to said main frame and extending forwardly therefrom in the general direction of and in close proximity to said draft beam and terminating in the medial regions of said draft beam, and means for selectively securing the extreme forward end of said tongue to the medial regions of said draft beam in selected positions to lock said frame in various positions of rocking adjustment.

6. In a reversible disc harrow for a tractor having a power lift device thereon, the combination of a main frame, means for detachably connecting said frame in trailed relation to the tractor and for also operatively connecting said frame to said lift device for bodily lifting and lowering thereby, a pair of disc gangs each having a subframe, said main frame comprising a border frame with spaced front and rear rails, a pair of supporting bars spanning the gap between said rails and slidable freely endwise of the latter, and pivot means for releasably securing said subframes to respective ones of said bars with said main frame clamped between each subframe and the corresponding bar and with said subframes in positions of selected angular adjustment with reference to said main frame, the position of said bars longitudinally of said main frame being determinative of the longitudinal spacing of said gangs.

7. In a reversible disc harrow, a centrally disposed draft beam extending longitudinally of the forward path of travel of the harrow, an elongated relatively narrow main frame extending transversely of said beam, means pivotally mounting said main frame on the trailing end of said beam for rocking movement in a fore and aft direction, a pair of disc gangs pivotally secured to said main frame on opposite sides of the beam and at eccentric points with respect to each gang, means for selectively releasably locking said gangs in reverse positions, a tongue secured to said main frame and extending forwardly therefrom in the general direction of and in close proximity to said draft beam and terminating in the medial regions of the latter, there being a longitudinally extending slot formed in said draft beam, a plate secured to and depending from the forward end of said main frame and projecting through said slot, said plate being provided with a series of holes therein, there being a hole formed in the medial regions of said beam designed for selective register with said first mentioned holes and a locking pin adapted to pass through selected alined holes in said plate and said beam for locking said main frame in various selected positions of locking adjustment.

AUGUSTA P. McKAY.

REFERENCES CITED

The following references are of record in the file of this patent:

UNITED STATES PATENTS

| Number | Name | Date |
| --- | --- | --- |
| 1,509,748 | Billings | Sept. 23, 1924 |
| 1,786,863 | Peterson | Dec. 30, 1930 |
| 2,152,347 | Ferraro | Mar. 28, 1939 |
| 2,336,410 | McKay | Dec. 7, 1943 |
| 2,431,959 | Olson et al. | Dec. 2, 1947 |
| 2,430,732 | Orelind et al. | Nov. 11, 1947 |

FOREIGN PATENTS

| Number | Country | Date |
| --- | --- | --- |
| 349,463 | Italy | June 15, 1937 |